(12) United States Patent
Vargantwar et al.

(10) Patent No.: US 8,670,788 B1
(45) Date of Patent: Mar. 11, 2014

(54) DYNAMIC PAGING CONCATENATION

(75) Inventors: Sachin R. Vargantwar, Overland Park, KS (US); Siddharth S. Oroskar, Overland Park, KS (US); Deveshkumar N. Rai, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 472 days.

(21) Appl. No.: 12/690,629

(22) Filed: Jan. 20, 2010

(51) Int. Cl.
*H04W 68/00* (2009.01)

(52) U.S. Cl.
USPC ........ 455/458; 455/426.1; 455/515; 455/450; 370/329; 370/330; 370/431

(58) Field of Classification Search
USPC .......... 455/422.1, 450–455, 464, 509, 426.1, 455/458, 515, 567, 432.1–434, 455/435.1–435.3; 370/328–337, 339, 370/341–348, 431–463
See application file for complete search history.

(56) References Cited

U.S. PATENT DOCUMENTS

| | | | | |
|---|---|---|---|---|
| 5,369,681 | A * | 11/1994 | Boudreau et al. | 455/456.1 |
| 6,181,945 | B1 * | 1/2001 | Lee | 455/445 |
| 6,216,004 | B1 * | 4/2001 | Tiedemann et al. | 455/442 |
| 6,636,745 | B2 * | 10/2003 | Oprescu-Surcobe et al. | 455/458 |
| 6,745,039 | B1 | 6/2004 | Di Lalla | |
| 7,020,102 | B2 * | 3/2006 | Tuomainen et al. | 370/311 |
| 7,366,526 | B2 * | 4/2008 | Zhang et al. | 455/458 |
| 7,778,653 | B2 * | 8/2010 | Narasimha | 455/458 |
| 7,933,613 | B2 * | 4/2011 | Willey | 455/458 |
| 7,953,037 | B2 * | 5/2011 | Lin et al. | 370/328 |
| 2003/0067899 | A9 * | 4/2003 | Chen et al. | 370/335 |
| 2003/0108069 | A1 * | 6/2003 | Yamada | 370/535 |
| 2004/0131075 | A1 * | 7/2004 | Sinnarajah et al. | 370/431 |
| 2005/0073977 | A1 * | 4/2005 | Vanghi et al. | 370/335 |
| 2005/0164741 | A1 * | 7/2005 | Rajkotia et al. | 455/561 |
| 2006/0003784 | A1 * | 1/2006 | Chion et al. | 455/518 |
| 2006/0014551 | A1 * | 1/2006 | Yoon et al. | 455/458 |
| 2006/0251033 | A1 * | 11/2006 | Oprescu-Surcobe et al. | 370/338 |
| 2006/0276207 | A1 * | 12/2006 | Harris et al. | 455/466 |
| 2006/0291410 | A1 * | 12/2006 | Herrmann | 370/328 |
| 2007/0060164 | A1 * | 3/2007 | Kim et al. | 455/450 |
| 2008/0032713 | A1 * | 2/2008 | Yang | 455/458 |
| 2008/0096520 | A1 | 4/2008 | Benco et al. | |
| 2008/0119166 | A1 * | 5/2008 | Zhu | 455/411 |

(Continued)

OTHER PUBLICATIONS

Unpublished U.S. Appl. No. 12/553,661, filed Sep. 3, 2009 entitled "Method and System for Paging a Mobile Station".
Unpublished U.S. Appl. No. 12/558,359, filed Sep. 11, 2009 entitled "Dynamic Paging Concatenation".

(Continued)

*Primary Examiner* — Ronald Eisner

(57) ABSTRACT

Methods and systems for dynamically adjusting the page-concatenation level based on RF conditions being experienced by a mobile station are disclosed herein. An exemplary method involves (i) determining that a mobile station should be paged, wherein the mobile station is operating in a coverage area of an access network; and (ii) in response: (a) using at least one indication of RF conditions for the mobile station as a basis for selecting a page-concatenation level for a page to the mobile station; and (b) transmitting the page to the mobile station, wherein the page is transmitted in a page message having the selected page-concatenation level. In an exemplary embodiment, the indication of RF conditions may be a determination that a mobile station is located near the border of a coverage area, which is made based on an elapsed time since the mobile station's last-received registration message.

20 Claims, 6 Drawing Sheets

(56) References Cited

U.S. PATENT DOCUMENTS

| | | | |
|---|---|---|---|
| 2008/0137588 A1* | 6/2008 | Santhanam | 370/320 |
| 2008/0291924 A1* | 11/2008 | Ishii | 370/400 |
| 2008/0293437 A1* | 11/2008 | Ranganathan et al. | 455/458 |
| 2009/0129265 A1* | 5/2009 | Ye et al. | 370/230 |
| 2009/0161651 A1* | 6/2009 | An et al. | 370/345 |
| 2009/0280823 A1* | 11/2009 | Petrovic et al. | 455/453 |

OTHER PUBLICATIONS

Cai et al., "Mitigating DoS Attacks on the Paging Channel by Efficient Encoding in Page Messages," Computer Science Department.

Unpublished U.S. Appl. No. 12/558,359, filed Sep. 11, 2009 entitled-"Dynamic Paging Concatenation".

Unpublished U.S. Appl. No. 12/572,829, filed Oct. 2, 2009 entitled "Overflow Pages in Heavily Loaded Slots".

* cited by examiner

DYNAMIC PAGING CONCATENATION

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet. When a mobile station, such as a cellular telephone, pager, or wirelessly-equipped computer, is positioned in a cell, the mobile station communicates via an RF air interface with the base station antennae of a cell. Consequently, a communication path can be established between the mobile station and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by mobile stations in the coverage areas and orchestrating handoff of calls between coverage areas. In turn, a switch and/or gateway may control one or more base station controllers and generally control wireless communications, by performing functions such as receiving and processing call requests, instructing base station controllers when to assign traffic channels, paging mobile stations, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may define an air interface "access channel" on which mobile stations can send "access probes" seeking to originate calls (e.g., voice calls, data sessions, and/or other "calls") or seeking to register their presence in the sector. Further, each sector may define an air interface "paging channel" on which the serving base station can page a mobile station. For example, paging channel may be used to send access probe acknowledgements and traffic channel assignment messages to served mobile stations. The paging channel also defines timeslots in which the base station can send various messages to particular mobile stations. For instance, if an access probe is received from one mobile station seeking to connect to a second mobile station, the base station may send a page via the paging channel to notify the second mobile station of the incoming call.

If a base station has numerous such messages to send, however, the paging channel can become congested, which may delay call setup or even result in a page not reaching the intended mobile station. Accordingly, in a further aspect of existing CDMA access networks, base station commonly group a certain number of pages (that are typically intended for different mobile stations) into a common page message for transmission via the paging channel. Furthermore, to conserve bandwidth, and so that more pages can be transmitted per timeslot, each page in a page message may be concatenated.

OVERVIEW

Concatenating pages so that they can be included in a common page message has certain drawbacks. For example, since some information is inevitably lost through concatenation, the probability of a mobile station receiving a page may decrease due to concatenation of the page. This may be particularly problematic in scenarios where a mobile station is already experiencing poor radio frequency (RF) conditions and thus may have a weak connection to the access network.

Accordingly, methods and systems are provided herein to dynamically adjust the page-concatenation level (e.g., how much concatenation is performed on a page, if any) based on an indication or indications of the RF conditions being experienced by the mobile station that is being paged. In an exemplary embodiment, the fact that a mobile is determined to be located near the edge of a sector, may serve as such an indication, as RF conditions are usually less favorable near the edges of sectors.

Furthermore, in a preferred embodiment, before a base station sends a page to a mobile station, the base station may determine the elapsed time since a last-received zone-based registration message from the mobile station. Since zone-based registration messages are sent whenever a mobile station enters a new sector (and thus are assumed to have been sent when the mobile station was at or near the edge of the sector), the base station may interpret a determination that the elapsed time is less than a certain threshold as an indication that the mobile station is near the edge of a sector, and thus likely to be experiencing less favorable RF conditions. The base station may then select a page-concatenation level involving less or even no concatenation for the page, so as to increase the probability that the mobile station receives the page.

More generally, in one aspect, an exemplary method involves (i) at an access network, determining that a mobile station should be paged, wherein the mobile station is operating in a coverage area of the access network; and (ii) in response to determining that the mobile station should be paged: (a) using at least one indication of radio frequency (RF) conditions for the mobile station as a basis for selecting a page-concatenation level for a page to the mobile station; and (b) transmitting the page to the mobile station, wherein the page is transmitted in a page message having the selected page-concatenation level.

In another aspect, an exemplary system comprises data storage; at least one processor; a communication interface configured to communicate with a mobile station operating in a coverage area of an access network; and program logic stored in the data storage and executable by the at least one processor. The program logic is executable to: to: (i) determine that the mobile station should be paged; and (ii) in response to determining that the mobile station should be paged: (a) use at least one indication of radio frequency (RF) conditions for the mobile station as a basis to select a page-concatenation level for a page to the mobile station; and (b) transmit the page to the mobile station in a page message having the selected page-concatenation level.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
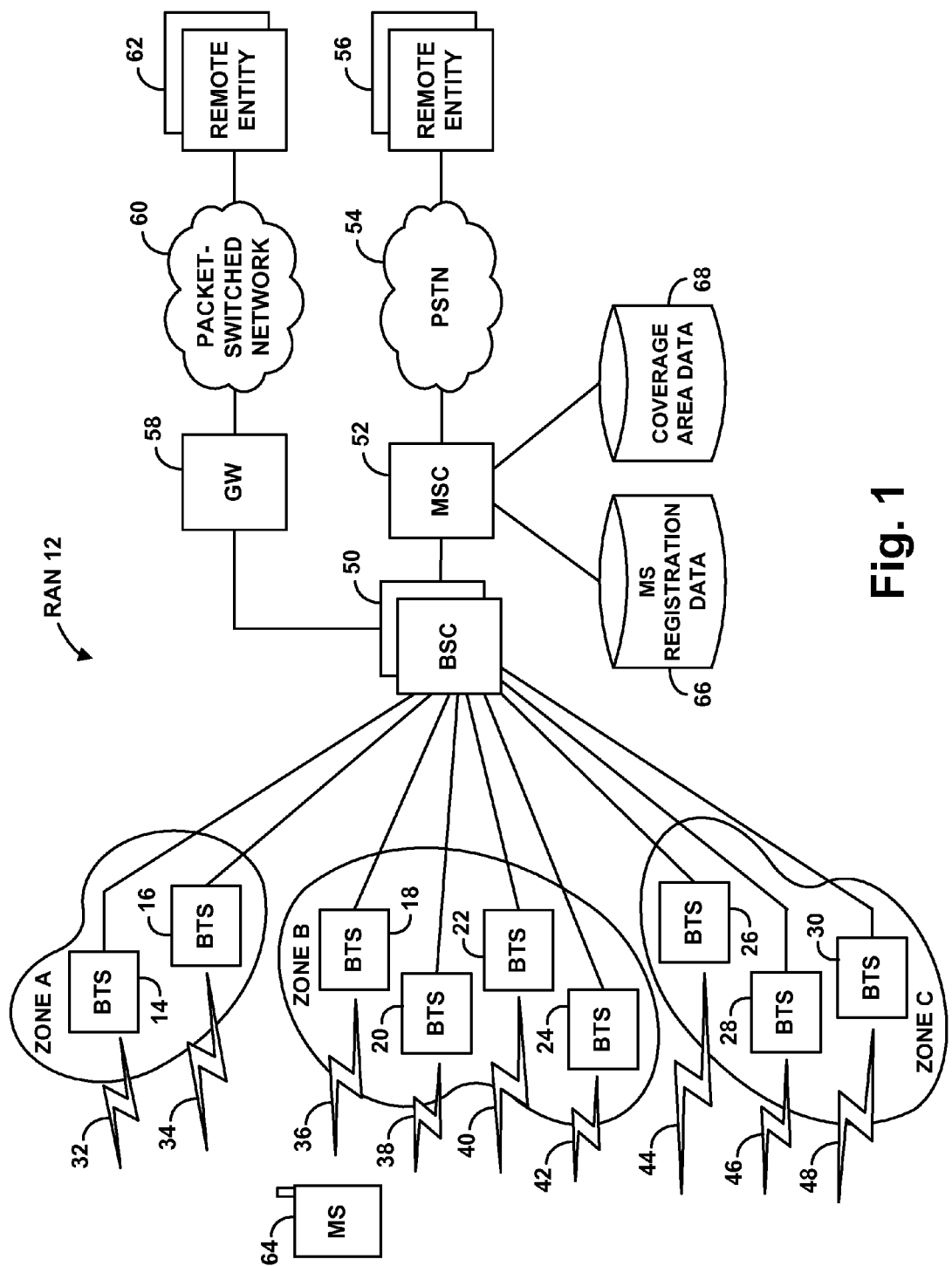
FIG. 1 is a simplified block diagram of a wireless communication network in which exemplary methods and systems can be implemented.

Referring to the drawings, as noted above, FIG. 1 is a simplified block diagram of a wireless communication network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

As shown in FIG. 1, the exemplary network includes at its core a radio access network (RAN) 12 that radiates to define numerous coverage areas in which mobile stations can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served mobile station can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas 32-48 as shown and to communicate with mobile stations in those coverage areas.

The coverage areas shown in the figure can be cell sites, cell sectors, or some other defined wireless coverage area (possibly even a combination of coverage provided by multiple base stations). For simplicity, just a single coverage area is shown emanating from each base station, but it is further understood that a typical base station may provide multiple discrete coverage areas, such as multiple cell sectors for instance.

Each base station controller may be coupled with one or more switches, such as a mobile switching center (MSC) 52, which provides connectivity with the public switched telephone network (PSTN) 54, so that served mobile stations can communicate with remote entities 56 on the PTSN. Additionally or alternatively, each base station controller may be coupled with one or more gateways, such as packet data serving node (PDSN) 58, which provides connectivity with a packet-switched network 60, so that served mobile stations can communicate with remote entities 62 on the packet-switched network.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. Further, it should be understood that actions that are generally described as being carried out by the RAN (or simply by the "network" or a "wireless communication network") may be carried out by various different entities or combinations of entities in the RAN, possibly in conjunction with other entities in communication with the RAN. It should also be understood that features and functionality described in reference to one network entity or combination of entities, such as a BTS, BSC, MSC, and/or PDSN, may also be carried out by other entities without departing from the scope of the invention. Yet further, note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

When RAN 12 seeks to page a mobile station 64 (e.g., for an incoming call or for some other reason), a switch, such as MSC 52, may send a page to numerous base stations in the switch's coverage area, such as BTSs 18-24, with the hope that when the base stations broadcast the page message, the mobile station will receive the page message in one of the associated sectors, and will respond. Given the scarcity of paging channel resources, however, most modern cellular networks are instead arranged to engage in a more targeted paging process known as "zone-based paging."

With zone-based paging, a cellular network is divided into paging zones, each with a respective zone ID, and paging is performed on a zone-basis. To facilitate this, each base station in the system may broadcast as one of its overhead parameters the zone ID for the zone in which the base station is located. Mobile stations operating in the network may then programmatically monitor the zone IDs indicated in the overhead messages and may automatically register with the network when they detect that they have moved into a new zone, or for other reasons. To register with the network, a mobile station may send a registration message via the access channel in its current sector, and a switch in the network would note the mobile station's registration and convey an indication of the registration to a home location register for later reference.

With this process, the registration records thereby maintained by switches and/or home location registers will indicate the paging zone in which each mobile station last registered. When a switch seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone. Once the designated base stations transmit the page message, if the mobile station does not respond to the page, the switch may then broaden the scope of the page, by sending the page message to a wider range of paging zones and perhaps ultimately to all base stations in the switch's serving area.

Using the general paging strategy that is implemented in many wireless access networks, the network may make up to three attempts to page a mobile station. In particular, the network may first attempt to transmit a page record in the paging zone in which the mobile station is registered (i.e., the base stations in the paging zone in which the mobile station is registered transmit the page record). Then, if the first attempt is unsuccessful (i.e., the mobile station does not acknowledge the page record), the network makes a second attempt to page the mobile station by again transmitting the page record in the paging zone in which the mobile station is registered, and possibly in adjacent zones as well. If the second attempt also fails, then the network makes a third attempt to page the mobile station, which typically involves a system-wide transmission of the page record (i.e., in all paging zones), although it is possible that a third attempt may be of a different scope as well.

As shown in FIG. 1, the base stations are grouped into zones A, B, and C to facilitate zone-based paging as described above. In particular, each base station may broadcast a zone ID indicating its zone, and a mobile station such as mobile station 64 may monitor the zone IDs broadcast in the coverage areas where the mobile station is operating. When the mobile station detects a change in zone ID, the mobile station may then responsively register its presence in the new zone, so that the RAN would then know to page the mobile station in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to mobile station registration data 66. The mobile station registration data 66 preferably comprises data that specifies per mobile station where the mobile station is currently registered, such as the zone in which the mobile station is currently registered, among possibly other information. More specifically, the mobile station registration data 66 may take the form of a visitor location register (VLR) database, which holds a record per mobile station in the MSC's service area. The mobile station's current zone of registration can thus be indicated in the mobile station's VLR record. Alternatively or additionally, the mobile station registration data can take the form of a home location register (HLR) database 70 that is accessible via the MSC 52. Still alternatively, the data may be stored internally at the MSC and/or base stations, or elsewhere in some other form.

FIG. 1 depicts a representative mobile station 64 by way of example, which could be a cell phone, wirelessly equipped personal digital assistant (PDA), or any other type of wirelessly-equipped device now known or later developed. The mobile station is preferably equipped with hardware, software, and/or other logic to communicate with RAN 12 in accordance with an agreed communication protocol, such as one of the protocols noted above for instance. For example, in an exemplary embodiment, mobile station 64 includes a wireless communication interface that functions to facilitate air interface communication with RAN 12 according to one or more protocols such as those noted above. Further, mobile station may include a user interface, which typically includes components for receiving input from a user of mobile station and providing output to a user of the mobile station. Yet further, mobile station 64 may include program logic stored in data storage (e.g., one or more volatile and/or non-volatile storage components of the mobile station, such as magnetic, optical, or organic storage components) and executable by one or more processors (e.g., general purpose and/or special purpose processors) to carry out various functions described herein.

Each mobile station, such as mobile station 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN).

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

Each mobile station 64 may typically be configured to send messages to RAN 12 via an access channel. These messages are generally referred to as "access probes." Access probes may be used to transmit various types of messages, such as registration messages to register or update the RAN with information associated with the mobile station, page response messages, SMS messages, etc.

An exemplary mobile station 64 may be configured to send various types of registration messages to the RAN 12. For instance, the examples described herein involve three types of registration messages (although it should be understood that alternative embodiments may involve other types of registration messages, without departing from the scope of the inventions). In particular, an exemplary mobile station 64 may be configured to send (i) distance-based registration messages, (ii) timer-based registration messages, and (iii) zone-based registration messages.

A mobile station 64 may be configured to transmit a timer-based registration message periodically or from time-to-time. For example, a mobile station may be configured to transmit a timer-based registration message whenever it has gone a threshold period of time (e.g., 30 minutes) without transmitting a registration message. The timer-based registration message thus alerts the RAN 12 that the mobile station 64 is still operating in the coverage area of the RAN 12, and provides the RAN 12 with the location the mobile station 64.

An exemplary timer-based registration message is shown below:

16:18:27.144 Access Channel: Registration
ACK_SEQ: 7 MSG_SEQ: 1 ACK_REQ: 1 VALID_ACK: 0
ACK_TYPE: 0
MSID_TYPE: 3, ESN: [0x 01 99 0d fc]
MFR 1, Reserved 38, Serial Number 69116,
IMSI: (Class: 0, Class_0_type: 1) [0x 01 8d 31 74 29 36]
00-416-575-0421
AUTH_MODE: 0
REG_TYPE: Timer-based
SLOT_CYCLE_INDEX: 2
MOB_P_REV: 1
EXT_SCM: 1
SLOTTED_MODE: 1
MOB TERM: 1

As shown, each registration message includes a REG_TYPE parameter indicating what type of registration message it is, which in the above case is timer-based. The format and parameters of registration messages are generally known in the art, and thus not discussed further herein.

A mobile station 64 may be configured to transmit a distance-based registration message whenever it moves a predetermined distance from the location where it last transmitted a registration message. For example, if a mobile station determines (using GPS and/or triangulation, for instance) that it has moved a predetermined distance without transmitting a registration message (e.g., 100 feet), the mobile station 64 may transmit a distance-based registration message to RAN 12.

A mobile station 64 may be configured to transmit a zone-based registration message when it enters a new zone in a coverage area (i.e., when a mobile station exits one zone and moves into another). Thus, a zone-based registration notifies the RAN 12 when mobile station 64 has entered a given zone and registers the mobile station 64 in the zone. More specifically, as zones are typically defined by a number of adjacent sectors, a zone-based registration message is typically sent when the mobile enters the first sector of a new paging zone. To facilitate zone-based registration messages, when mobile station 64 enters a given sector, RAN 12 may provide mobile station 64 with the zone-ID of a given sector via overhead messages. Accordingly, if the zone-ID of the new sector differs from the zone-ID of the previous sector in which mobile station 64 was operating, mobile station 64 sends a zone-based registration message.

In a further aspect, a mobile station 64 may also be configured to send a Radio Environment Report (RE-Report) to the RAN 12. Typically, RE-Reports are included in each access probe transmitted to the RAN 12 by a mobile station 64. An RE-Report may be used to provide the RAN 12 with an indication of the forward-link RF conditions that the mobile is experiencing when the mobile station generates and transmits the RE-Report. As such, RE-Reports may be included in access probes with zone-based registration messages, distance-based registration messages, and/or time-based registration messages.

Each RE-Report includes parameters that are indicative of the RF conditions being experienced by the mobile station when the mobile station generates and transmits the RE-Report. Thus, in some embodiments, parameters included in a RER may be used by a base station in the process of determining whether to concatenate a page to the mobile and/or what level of concatenation to apply.

Figure 2:
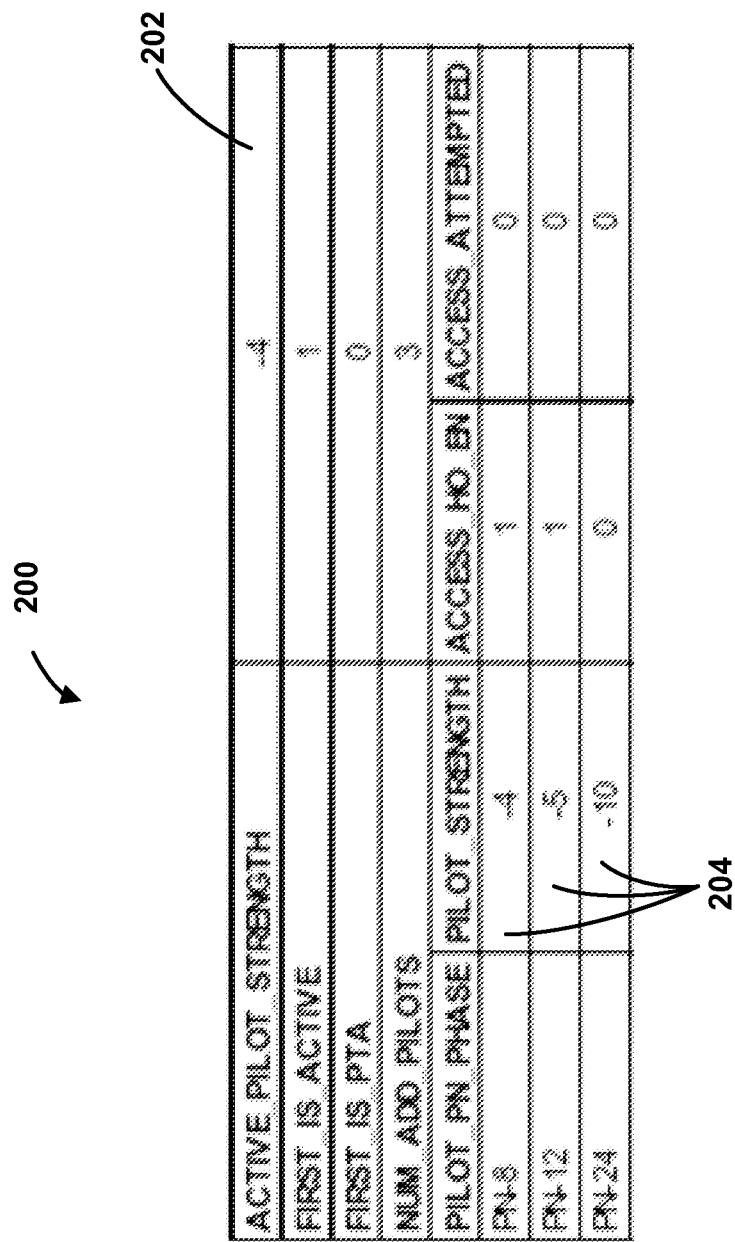
FIG. 2 is a diagram showing parameters in an Radio Environment Report, according to an exemplary embodiment.

FIG. 2 is a diagram showing parameters in an exemplary Radio Environment Report 200. The format and parameters of RE-Reports are generally known in the art, and thus discussed only briefly herein. In particular, RE-Report 200 includes parameters indicating the strength of the pilot signal received by the mobile station from the mobile station's current sector, as shown by the ACTIVE_PILOT_STRENGTH parameter 202, and the strength of the pilot signal received from each sector in the mobile station's active set, as shown by PILOT_STRENGTH parameters 204. In the illustrated example, the pilot signal strength parameters (e.g., ACTIVE_PILOT_STRENGTH parameter 202 and PILOT_STRENGTH parameters 204) are provided in terms of the EcIo value for the corresponding sector. For example, the ACTIVE_PILOT_STRENGTH parameter 202 indicates that the EcIo is negative four decibels in the sector in which the mobile station is operating. (EcIo is a decibel measure accounting for interference and signal strength that is well known in the art, and thus not discussed further herein.)

RAN 12 may use an RE-Report, such as RE-Report 200, as an indicator of the RF conditions being experienced by a mobile station 64. In particular, a base station may use the ACTIVE_PILOT_STRENGTH parameter 202, and possibly the PILOT_STRENGTH parameters 204 as well, to determine the RF conditions a mobile station is experiencing.

Figure 3:
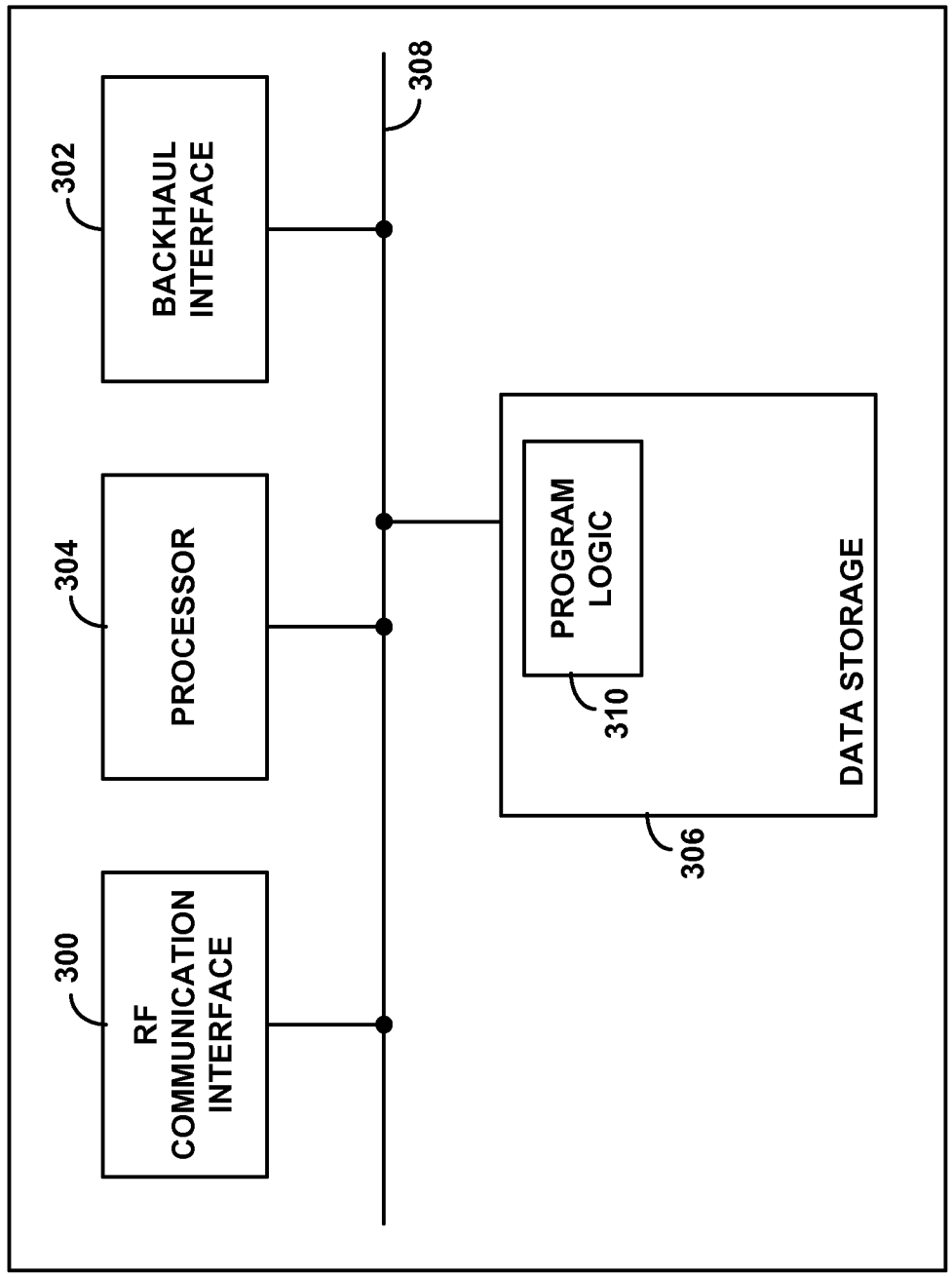
FIG. 3 is a simplified block diagram showing functional components of a base station, according to an exemplary embodiment.

FIG. 3 is a simplified block diagram showing functional components of an exemplary base station (or any other entity arranged to carry out analogous functions). As shown, the base station includes an RF communication interface 300, a backhaul interface 302, a processor 304, and data storage 306, all of which may be communicatively linked together by a system bus, network, or one or more other connection mechanisms 308.

RF communication interface 300 may comprise one or more antenna structures, one or more power amplifiers, and associated equipment, for engaging in RF communication with mobile stations operating within the base station's coverage, according to one of the air interface protocols noted above for instance. Backhaul interface 302 may comprise any sort of communication link or mechanism enabling the base station to exchange signaling and bearer data with other RAN entities such as with BSC 50, or via BSC 50 with MSC 52 for instance. Processor 304 may comprise one or more processors (e.g., general purpose and/or special purpose processors), such as microprocessors for instance. And data storage 306 may comprise one or more volatile and/or non-volatile storage components, such as magnetic, optical, or organic storage components, integrated in whole or in part with processor 304. As further shown, data storage 306 preferably contains program logic 310 (e.g., machine language instructions) executable by processor 304 to carry out various functions, such as the functionality provided by the exemplary methods described herein.

In a further aspect, a RAN, and in particular, an exemplary base station (which may include one or more BTS and/or a BSC), working with an exemplary MSC, may be configured to page one or more mobile stations by generating and transmitting a General Page Message (GPM) over one or more paging channels. In an exemplary embodiment, a network will typically receive an indication that a mobile station should be paged (e.g., an incoming call), which includes an identifier of the mobile station, such as a MIN or IMSI. The base station may then use the MIN or IMSI as a basis to determine the carrier air interface (CAI) transmit address fields, and encode these fields into a page record, which may then be placed in a GPM for transmission in the zone in which the mobile station is registered (and possibly other zones as well). Additional details of this process are well known in the art, and thus not discussed in detail herein.

Further, an exemplary base station may be configured to create a page message that includes multiple page records, such that multiple mobile stations can be paged using a single page message. Furthermore, page records may be concatenated so that more page records may be included in a page message than otherwise could be. For example, concatenation levels may specify concatenation such that at least eight page records may be concatenated in a single GPM. Alternatively, other concatenation levels may define concatenation in which at least five page records may be included in a single GPM. Other concatenation techniques are also possible.

Without concatenation, a GPM, which occupies two half frames in the paging channel, typically cannot include more than four page records. In comparison, an exemplary concatenation may specify that a GPM can concatenate two page records in two to three half frames, which allows for at least five page records to be sent in a single timeslot. Other concatenation levels may allow for a GPM in which two to eight page records can be concatenated and sent in two to eight half frames, which allows a base station to transmit at least eight page records in a timeslot.

Concatenating page records into a GPM may reduce the load on the paging channel, thereby helping to reduce paging channel occupancy (PCO). When multiple page records are concatenated in a GPM, some information which is typically included in a page is not repeated for each page record. For example, length bits, overhead bits, CRC bits, and reserved bits, are not repeated for each page record in a GPM. However, there may be a performance tradeoff since more page records are being concatenated into the same 80 ms slot, and therefore, some page records may fail to reach their intended mobile stations, which reduces the paging-success rate. In practice, a two to three percent decrease in the paging success rate has been observed.

According to an exemplary embodiment, a network entity or entities, such as a base station, may be configured to vary the level of concatenation used for pages. For example, a base station may be configured to create and/or transmit GPMs in which page records are concatenated to various degrees, and to selectively include a given page record in a GPM having a selected level of concatenation. In addition, a base station may be configured to send a page record in a page message without concatenating the page record. As such, an exemplary method may be used to dynamically select a page-concatenation level for each page record, and then include the page record in a GPM having the selected page-concatenation level. In basic form, the selection may a binary choice between concatenating a page record and not concatenating a page record. Alternatively, the page-concatenation level may be selected from multiple possible page-concatenation level having varying degrees of concatenation. An exemplary method may therefore help improve paging efficiency, by dynamically reducing or eliminating concatenation to improve chances that a page is received successfully in scenarios where a page is less likely to be received. In particular, an exemplary method may help to improve the paging success rate in scenarios where indications exist that a mobile station is experiencing poor RF conditions.

Figure 4:
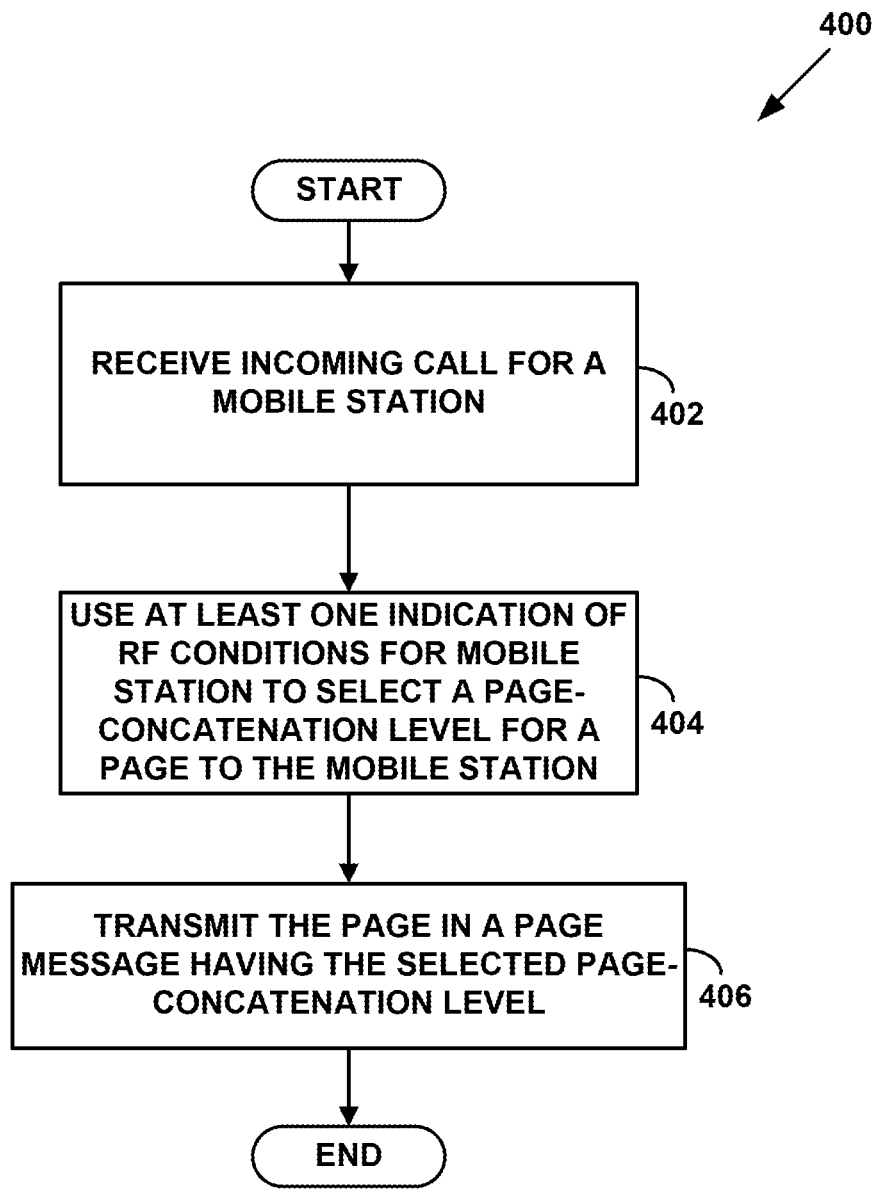
FIG. 4 is a flow chart illustrating a method that may be implemented at an access network in order to page a mobile station, according to an exemplary embodiment.

FIG. 4 is a flow chart illustrating a method 400 that may be implemented at an access network in order to page a mobile station, according to an exemplary embodiment. The method is described by way of example, with reference to a base station carrying out the method to page a mobile station that is operating in a coverage area served by the base station. However, it should be understood that other access-network entities and/or entities in communication with an access network may be configured to carry out the method or portions thereof, without departing from the scope of the invention.

The method 400 involves the base station receiving an incoming call for the mobile station, as shown by block 402. In response, the base station initiates the process of paging the mobile station. In particular, the base station uses at least one indication of the radio frequency (RF) conditions for the mobile station (i.e., an indication of the RF conditions being experienced by the mobile station) as a basis for selecting a page-concatenation level for a page to the mobile station, as shown by block 404. The base station then transmits the page in a page message having the selected page-concatenation level, as shown by block 406.

It should be understood while the functions shown by blocks 404 and 406 are typically carried out to page a mobile station for an incoming call, the steps of selecting a page-concatenation level based on RF conditions and transmitting the page with the selected level may be carried out in any scenario where a base station determines that a mobile station should be paged. Thus, steps 404 and 406 may be responsive to the base station determining that the mobile station should be sent a page record for any reason.

The indication or indications of the RF conditions experienced by a mobile station may take various forms. In general, the base station may use any indication of the quality of the RF signal being experienced by the mobile station. For instance, in practice it has been observed that RF quality typically degrades when a mobile station is located near the edge of a sector. Accordingly, a base station may determine that a mobile station is located near the edge of a zone (or in a border area of a zone), and consider this determination to indicate that RF conditions for the mobile station are less favorable. On the other hand, a base station may interpret a determination that a mobile station is not located in a border area (i.e., not near the edge of a sector) to indicate that the mobile station is experiencing more-favorable RF conditions. In other embodiments, a base station may additionally or alternatively utilize other indications of the RF conditions for a mobile station to select a page-concatenation level. For example, the base station may use parameters included in an RE-Report from a mobile station that are indicative of RF quality. Other indications are also possible.

Figure 5:
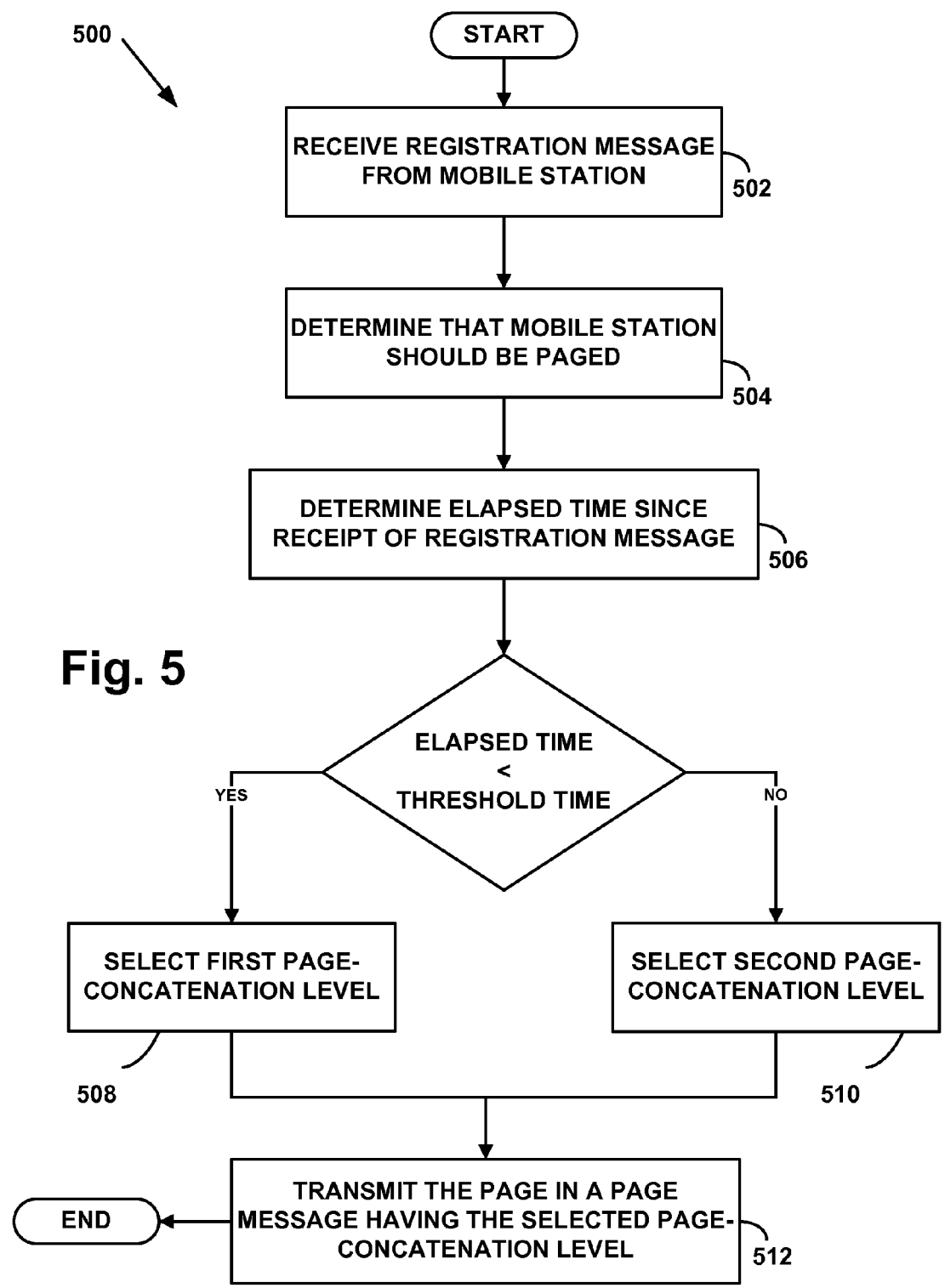
FIG. 5 is another flow chart illustrating a method 500 that may be implemented at an access network in order to page a mobile station, according to an exemplary embodiment.

FIG. 5 is another flow chart illustrating a method 500 that may be implemented at an access network in order to page a mobile station, according to an exemplary embodiment. The method 500 helps address the problem of the generally poor RF-signal quality near the edges of zones. More specifically, since mobile stations typically send zone-based registration edges upon entering a zone, the base station may interpret a more-recently received zone-based registration message to indicate that a mobile station is closer to the edge of the zone (i.e., in a border area), and thus experiencing less-favorable RF conditions. Accordingly, when the elapsed time since the last zone-based registration message is less than a predetermined threshold, the base station may send a page record to the mobile station without concatenating the page record, or with a lower level of concatenation.

In particular, the method 500 involves the base station receiving a registration message from the mobile station (which is preferably a zone-based registration message), as shown by block 502. At a given time, which is likely after receipt of the registration message (as shown), but may also be concurrent with or after receipt of the registration message, the base station determines that a mobile station should be paged, as shown by block 504. In response, the base station determines an elapsed time since the registration message was received, as shown by block 506. The elapsed time is typically the time between (a) receipt of the registration message or a time stamp included in the registration message by the mobile station and (b) the determining of the elapsed time. The base station may then use the elapsed time as an indication of RF conditions for the mobile station, and thus as a basis for selecting a page-concatenation level for a page to the mobile station.

For instance, in the illustrated example, if the elapsed time is less than a predetermined threshold time, the base station selects a first page-concatenation level, as shown by block 508. Alternatively, if the elapsed time is greater than the predetermined threshold time, the base station selects a second page-concatenation level, as shown by block 510. The base station then transmits the page in a page message having the determined page-concatenation level, as shown by block 512.

To facilitate this determination, various RAN entities may maintain, or provide another entity with information to maintain, a time stamp indicating when each registration message is received. For example, when an RE-Report and/or a registration message is received at an HLR, and a corresponding data record is created, the HLR may also create a time stamp indicating the time of receipt. The time stamp may then be stored as part of the data record of the RE-Report and/or registration message, or otherwise associated with the data record. Alternatively, when an RE-Report and/or a registration message is received at a base station (e.g., at a BTS and/or at a BSC), the base station may create a time stamp indicating the time of reception (or possibly another appropriate time, such as an estimated time of transmission from the mobile station). The base station may then relay the time stamp to the HLR, or may create a database entry itself, which associates the timestamp with the mobile station (and thus may also include a mobile station identifier such as a MIN or IMSI, for instance). Other techniques are also possible.

In method 500, the comparison of the elapsed time to a threshold is used to determine whether a mobile station is likely located within a border area of a sector, and to select the appropriate page-concatenation level (preferably less or no concatenation in a border area, and more concatenation otherwise). In alternative embodiments, the base station may use other indications and/or techniques to determine whether or not a mobile station is located in a border area of the sector, and thus to select a page-concatenation level. For instance, the base station may retrieve the most-recent geographic location (such as the GPS coordinates of the mobile station, or the location determined using triangulation), and determine if the mobile station is located in an area or sector defined as a border area of a zone. Other techniques for determining whether a mobile station is located in a border area are also possible.

In other embodiments, an indication of the RF conditions for a mobile station may be provided by information included in the registration message. For instance, as mobile stations typically include a RE-Report in each access probe (typically in conjunction with a registration message, in the event the access probe includes a registration message), and each RE-Report may include parameters indicative of RF conditions at the mobile station, these parameters may be utilized in an exemplary method.

Figure 6:
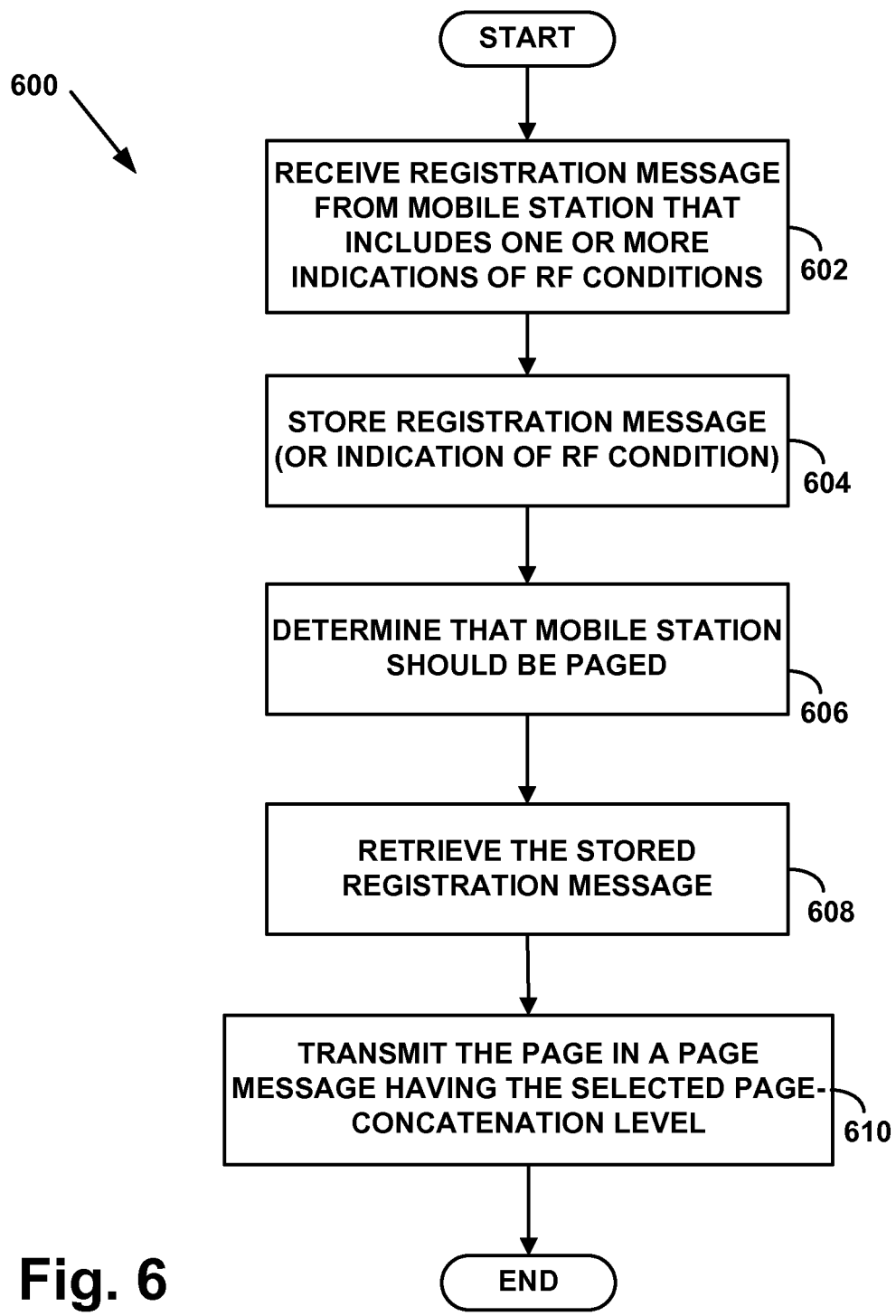
FIG. 6 is another flow chart illustrating a method 600 that may be implemented at an access network in order to page a mobile station, according to an exemplary embodiment.

FIG. 6 is another flow chart illustrating a method 600 that may be implemented at an access network in order to page a mobile station, according to an exemplary embodiment. In FIG. 6, the base station uses at least one indication of RF conditions included in a received registration message as a basis for selecting the page-concatenation level. The method 600 involves the base station receiving a registration message from a mobile station, which includes one or more indications of RF conditions being experienced by the mobile station, as shown by block 602. For instance, an indication of the RF conditions being experienced may be included in an RE-Report, which is included in the registration message. The base station may then store the registration message in a database, so that it can be accessed at a later time, as shown by block 604. Additionally or alternatively, the base station may separately store the RE-Report itself, the indication of the RF conditions included in the RE-Report, and/or other indications of the RF conditions being experienced by the mobile station.

At some point, which is likely after receipt of the registration message, but may also be concurrent with or even before receipt of the registration message, the base station determines that the mobile station should be paged, as shown by block 606. In response, the base station retrieves the stored indication (or indications) of the mobile station's RF conditions and uses the indication as a basis for selecting a page-concatenation level, as shown by block 608. The base station then transmits the page in a page message having the determined page-concatenation level, as shown by block 610.

The registration message used by the base station is preferably (i) a zone-based registration message, (ii) a distance-based registration message, or (iii) a time-based registration message, and, referring back to FIG. 2, the indication of the RF conditions is preferably the ACTIVE_PILOT_STRENGTH parameter 202. In addition, PILOT_STRENGTH parameters 204 may be used as additional indications of RF conditions for the mobile station. Further, it should be understood that other RE-Report and/or registration message parameters may be used, and further, that an access network may obtain indications of the RF conditions being experienced by a mobile station from sources, without departing from the scope of the invention.

To incorporate the ACTIVE_PILOT_STRENGTH parameter 202, a threshold EcIo may be defined. For example, no concatenation may be applied when EcIo is less than negative seven decibels, and concatenation according to FR4916E may be applied when EcIo is greater than negative seven. Thus, since ACTIVE_PILOT_STRENGTH parameter 202 indicates the EcIo is negative four decibels, the base station would concatenate the page record in a GPM. Furthermore, it is possible that ranges of EcIo values may be defined, with each range corresponding to a different page-concatenation level. For example, ranging from EcIo values indicating the worst RF conditions to the best (and corresponding page-concatenation levels ranging from the least to the most concatenation), an EcIo of less than negative fourteen decibels may correspond to a first paging concatenation level, an EcIo between negative ten and negative fourteen decibels may correspond to a second paging concatenation level, an EcIo between negative seven and negative ten decibels may correspond to a third paging concatenation level, and an EcIo of greater than negative seven decibels may correspond to a fourth paging concatenation level. Other examples are also possible.

In a further aspect, the base station may use both the elapsed time since a last-received zone-based registration message and the RER from a mobile station to select a page-concatenation level to apply to page record for the mobile station. For instance, if the threshold elapsed time since the last-received zone-based registration message is one minute, and the base station determines that that the elapsed time for a given mobile station is thirty seconds, the base station may therefore conclude that the mobile station is likely located in a border area. However, before selecting a paging concatenation level, the base station may retrieve the last-received RER and determine if, despite its likely location in a border area, the RF conditions are still of an acceptable quality.

In exemplary methods, such as those shown in FIGS. 4-6, the step of selecting the page-concatenation level for the page to the mobile station may be accomplished using various techniques. For example, selecting the page-concatenation level for the page to the mobile station may involve selecting either (a) no concatenation or (b) a predetermined page-concatenation level. Alternatively, selecting the page-concatenation level may involve selecting the page-concatenation level from plurality of available page-concatenation levels.

In a further aspect, in exemplary methods, the step of selecting a page-concatenation level for the page record may be implemented by inserting the page record into a GPM having the selected level. For instance, the network may determine that a first page record should be concatenated according to FR4916E, while a second page record should be concatenated according to FR4916B. Alternatively, the network may select a page-concatenation level of zero (i.e., no concatenation), and thus include the page record in a page message without any concatenation. Other selection processes are also possible.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method comprising:
at an access network, determining that a first mobile station should be paged, wherein the mobile station is operating in a coverage area of the access network; and
in response to determining that the mobile station should be paged:
using at least one indication of radio frequency (RF) conditions for the first mobile station as a basis for selecting a page-concatenation level for a page to the first mobile station; and
transmitting the page to the first mobile station, wherein the page is transmitted in a page message having the selected page-concatenation level, wherein the page message also includes at least one page to a second mobile station, and wherein the selected page-concatenation level indicates a data-size reduction for both the page to the first mobile station and the at least one page to the second mobile station.

2. The method of claim 1, further comprising making a determination that the first mobile station is located in a border area of the coverage area, wherein the at least one indication of the RF conditions for the mobile station comprises the determination that the mobile station is located in the border area.

3. The method of claim 2, wherein the coverage area comprises a sector in the access network, and wherein determining that the first mobile station is located in a border area comprises determining that the first mobile station is located within a predetermined distance from an edge of the sector.

4. The method of claim 1, further comprising:
at the access network, receiving a registration message from the first mobile station; and
determining an elapsed time since the registration message was received;
wherein using the at least one indication of RF conditions for the first mobile station as a basis for selecting the page-concatenation level comprises using the elapsed time since the registration message was received as the basis for selecting the page-concatenation level.

5. The method of claim 4, wherein the registration message comprises a zone-based registration message.

6. The method of claim 1, wherein selecting the page-concatenation level for the page to the first mobile station comprises selecting either (a) no concatenation or (b) a predetermined page-concatenation level.

7. The method of claim 1, wherein selecting the page-concatenation level for the page to the first mobile station comprises selecting the page-concatenation level from plurality of available page-concatenation levels.

8. The method of claim 1, further comprising, in response to determining that the first mobile station should be paged and prior to using the at least one indication of the RF conditions for the first mobile station as a basis for selecting the page-concatenation level, receiving the at least one indication of the RF conditions for the first mobile station.

9. The method of claim 8, wherein the at least one indication of the RF conditions for the first mobile station is received at the access network in a registration message from the first mobile station.

10. The method of claim 9, wherein the registration message comprises (i) a zone-based registration message, (ii) a distance-based registration message, or (iii) a time-based registration message.

11. The method of claim 9, wherein the at least one indication of the RF conditions for the first mobile station comprises a Radio Environment Report message included in the registration message.

12. A system comprising:
non-transitory data storage;
at least one processor;
a communication interface configured to communicate with a first mobile station operating in a coverage area of an access network; and
program logic stored in the non-transitory data storage and executable by the at least one processor to:
determine that the first mobile station should be paged;
in response to determining that the mobile station should be paged:
(a) use at least one indication of radio frequency (RF) conditions for the first mobile station as a basis to select a page-concatenation level for a page to the first mobile station; and
(b) transmit the page to the first mobile station in a page message having the selected page-concatenation level, wherein the page message also includes at least one page to a second mobile station, and wherein the selected page-concatenation level indicates a data-size reduction for both the page to the first mobile station and the at least one page to the second mobile station.

13. The system of claim 12, further comprising program logic stored in the non-transitory data storage and executable by the at least one processor to make a determination that the first mobile station is located in a border area of the coverage area, wherein the at least one indication of the RF conditions for the first mobile station comprises the determination that the first mobile station is located in the border area.

14. The system of claim 12, wherein the communication interface is further configured to receive a registration message from the first mobile station, the system further comprising:
    wherein the communication interface is further configured to receive a registration message from the first mobile station; and
    further comprising program logic stored in the non-transitory data storage and executable by the at least one processor to:
    determine an elapsed time since the registration message was received; and
    use the elapsed time since the registration message was received as the basis to select the page-concatenation level.

15. The system of claim 14, wherein the registration message comprises a zone-based registration message.

16. The system of claim 12, wherein selecting the page-concatenation level for the page to the first mobile station comprises selecting either (a) no concatenation or (b) a predetermined page-concatenation level.

17. The system of claim 12, wherein selecting the page-concatenation level for the page to the first mobile station comprises selecting the page-concatenation level from plurality of possible page-concatenation levels.

18. The system of claim 12, further comprising, wherein the communication interface is further configured to receive from the first mobile station a message that provides the at least one indication of the RF conditions.

19. The system of claim 18, wherein the message comprises (i) a zone-based registration message, (ii) a distance-based registration message, or (iii) a time-based registration message.

20. The system of claim 18, wherein the at least one indication of the RF conditions for the first mobile station comprises at least one parameter included in a Radio Environment Report received from the mobile station.

* * * * *